(12) United States Patent
Pattar

(10) Patent No.: US 8,255,659 B1
(45) Date of Patent: Aug. 28, 2012

(54) METHOD AND SYSTEM FOR ACCESSING STORAGE

(75) Inventor: Vishwanath Pattar, Bangalore (IN)

(73) Assignee: Netapp, Inc., Sunnnyvale, CA (US)

( * ) Notice: Subject to any disclaimer, the term of this patent is extended or adjusted under 35 U.S.C. 154(b) by 420 days.

(21) Appl. No.: 12/562,963

(22) Filed: Sep. 18, 2009

(51) Int. Cl.
*G06F 12/02* (2006.01)

(52) U.S. Cl. .. 711/170; 711/114; 711/165; 711/E12.002

(58) Field of Classification Search ................. 711/114, 711/165, 170, 173, E12.002
See application file for complete search history.

(56) References Cited

U.S. PATENT DOCUMENTS

2008/0005507 A1* 1/2008 Madnani et al. .............. 711/161

* cited by examiner

*Primary Examiner* — Jasmine Song

(74) *Attorney, Agent, or Firm* — Klein, O'Neill & Singh, LLP

(57) ABSTRACT

Method and system is provided for accessing storage. A first logical data structure is created without receiving a client request from a computing system. A first identifier for identifying the first logical data structure is assigned to the first logical data structure. Upon receiving a client request, a second logical data structure associated with a storage device is generated and the first identifier is assigned to the second logical data structure. The second logical data structure identified by the first identifier is then used by the computing system.

32 Claims, 7 Drawing Sheets

METHOD AND SYSTEM FOR ACCESSING STORAGE

BACKGROUND

1. Technical Field

The present disclosure relates to storage systems.

2. Related Art

Various forms of storage systems are used today. These forms include network attached storage (NAS) systems, storage area networks (SANs), and others. Network storage systems are commonly used for a variety of purposes, such as providing multiple users with access to shared data, backing up data (e.g., by data mirroring) and others.

A network storage system typically includes at least one computing system (may also be referred to as a "server"), which is a processing system configured to store and retrieve data on behalf of one or more client processing systems ("clients"). In the context of NAS, a storage server operates on behalf of one or more clients to store and manage shared files in a set of mass storage devices, such as magnetic or optical disks or tapes.

In a SAN context, the storage server provides clients with block-level access to stored data. Some storage systems may be capable of providing clients with both file-level access and block-level access.

Computing systems typically use LUNs (logical unit numbers) to access storage devices. The LUNs are typically created in response to a request from a computing system system. Typically, a storage system managing storage space creates the LUN and assigns it to the computing system. Before the computing system can use the LUN, it has to be discovered via a discovery process.

The discovery process for accessing the LUN is often defined by a standard or protocol, for example, Fibre Channel and other storage and network protocols. Typically, during discovery, a client computing system sends out a discovery packet/request seeking access to LUNs. The storage system or a management application responds to the request and presents the LUN to the computing system. Therefore, the discovery process may consume processor resources and computing time. Continuous efforts are being made to efficiently assign LUNs and improve the overall discovery process.

SUMMARY

In one embodiment, a method and system for accessing storage is provided. A first logical data structure is created without receiving a client request from a computing system. A first identifier for identifying the first logical data structure is assigned to the first logical data structure. Upon receiving a client request, a second logical data structure associated with a storage device is generated and the first identifier is assigned to the second logical data structure. The second logical data structure identified by the first identifier is then used by the computing system.

In another embodiment, a machine implemented method is provided. A first logical data structure is generated without receiving a client request and is assigned a first identifier. Upon receiving a client request, a second logical data structure associated with a storage device is generated. The second logical data structure identifier is replaced by the first identifier. The second logical data structure having the first identifier is then used by the client.

In yet another embodiment, a machine implemented method is provided. A client request for accessing a logical data structure associated with a storage device is received. The process retrieves a first identifier for a logical data structure created before the client request is received. The logical data structure in response to the client request is then generated and the first identifier is used to identify the generated logical data structure.

In another embodiment, a machine implemented method is provided. The process includes: (a) creating a first logical data structure without receiving a client request; (b) assigning a first identifier (ID) to the first logical data structure; (c) discovering the first logical data structure having the first logical data structure ID; (d) upon receiving a client request, creating a second logical data structure associated with a storage device and assigning a second logical data structure ID to the second logical data structure; (e) swapping the second logical data structure ID with the first logical data structure ID; and (f) using the second logical data structure without having to discover the second logical data structure ID.

In yet another embodiment, a machine readable storage medium storing executable instructions, which when executed by a machine, causes the machine to perform a method for accessing storage. The method includes: (a) creating a first logical data structure without receiving a client request; (b) assigning a first identifier (ID) to the first logical data structure; (c) discovering the first logical data structure having the first logical data structure ID; (d) upon receiving a client request, creating a second logical data structure associated with a storage device and assigning a second logical data structure ID to the second logical data structure; (e) swapping the second logical data structure ID with the first logical data structure ID; and (f) using the second logical data structure without having to discover the second logical data structure ID.

In another embodiment a computer program product is provided. The product includes a computer usable storage medium having computer readable instructions embodied therein for accessing storage. The storage medium includes: (a) instructions for creating a first logical data structure without receiving a client request; (b) instructions for assigning a first identifier (ID) to the first logical data structure; (c) instructions for discovering the first logical data structure having the first logical data structure ID; (d) instructions for creating a second logical data structure associated with a storage device upon receiving a client request, and instructions for assigning a second logical data structure ID to the second logical data structure; (e) instructions for swapping the second logical data structure ID with the first logical data structure ID; and (f) instructions for using the second logical data structure without having to discover the second logical data structure ID.

In yet another embodiment, a machine implemented method for accessing a logical unit number (LUN) is provided. The method creates a first LUN without receiving a client request. The first LUN with a first LUN ID is discovered by a computing system. Upon receiving a client request, a second LUN having a second LUN identifier (second LUN ID) is created. The second LUN ID is then swapped with the first LUN ID; and the second LUN is then used by the computing system without having to discover the second LUN ID.

In one embodiment, resources are used efficiently because when the computing system wants to create and use a LUN, it does not have to go through a discovery process because an already discovered LUN ID is used for the second LUN. The already discovered LUN is created without a client request by a storage system and a management application, when the storage system and management application are not busy with other tasks.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

Definitions

Figure 1A:
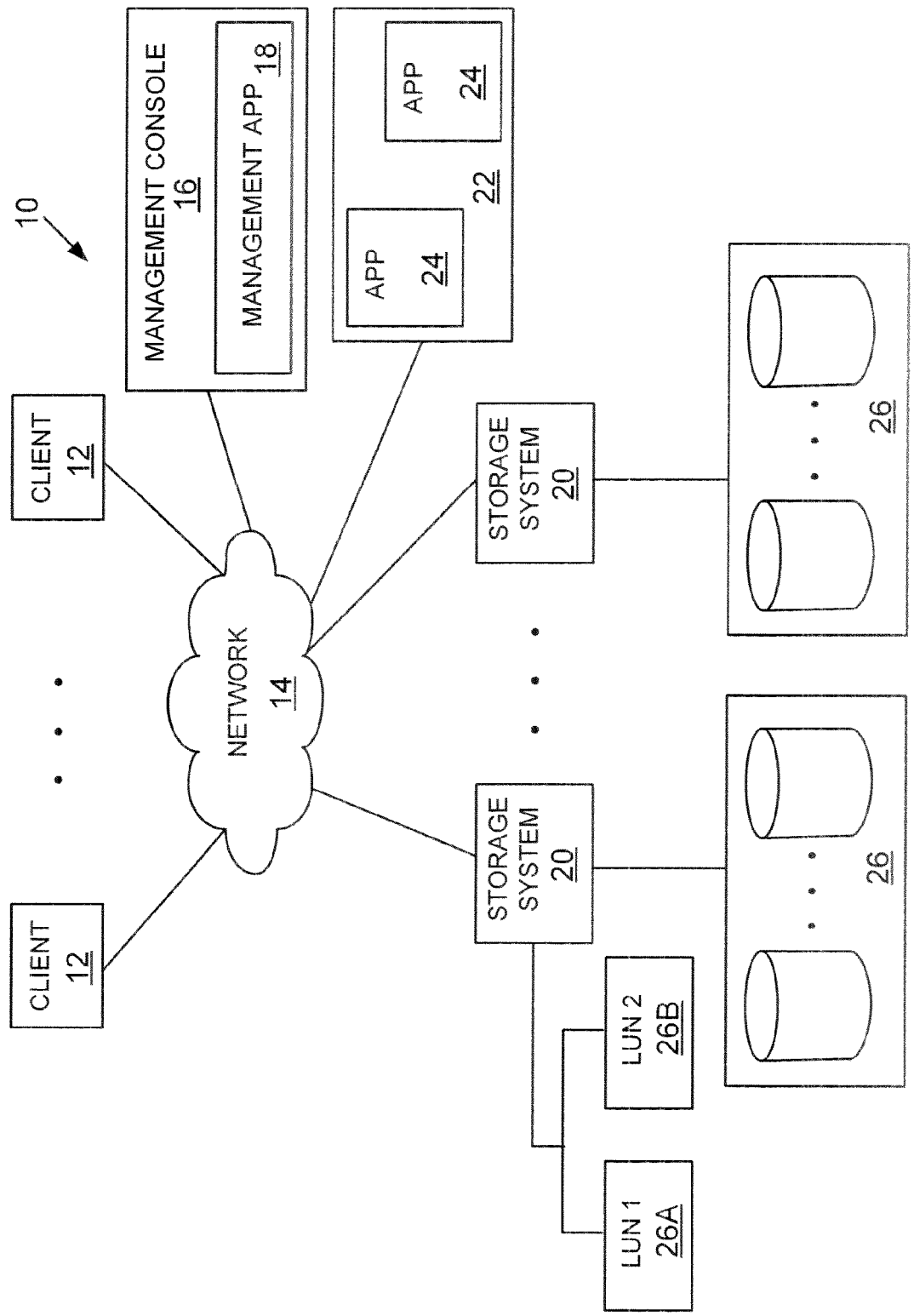
FIG. 1A shows a block diagram of a system using the embodiments disclosed herein.

The following definitions are provided as they are typically (but not exclusively) used in the computing/storage environment, implementing the various adaptive embodiments described herein.

"CIFS" means the Common Internet File System Protocol, an access protocol that client systems use to request file access services from storage systems over a network.

"Data Container" means a logical unit of data and may include a block, a volume, a file, a LUN or any other data structure.

"FC" means Fibre Channel, a high-speed network technology primarily used for storage networking. Fibre Channel Protocol (FCP) is a transport protocol (similar to Transmission Control Protocol (TCP) used in Internet Protocol ("IP") networks) which predominantly transports SCSI commands over FC networks.

"LUN" means a logical unit number. A LUN represents an addressable logical device that is a part of a physical device, for example, part of a storage sub-system. Typically, a LUN is identified by a unique identifier that may be referred to as LUN ID. A LUN may be any logical data structure that is associated with a storage device and before it can be accessed by a computing system it is discovered by a computing system.

"iSCSI" means the Internet Small Computer System Interface, an IP based storage networking standard for linking data storage facilities. The standard allows carrying SCSI commands over IP networks. iSCSI may be used to transmit data over local area networks (LANs), wide area networks (WANs), or the Internet, and can enable location-independent data storage and retrieval.

"NFS" means Network File System, a protocol that allows a user to access storage over a network.

"Provisioning" means setting aside and configuring a storage resource for a particular purpose.

"Resource pool" is a collection of one or more storage servers and one or more aggregates, and its configuration is typically determined by a network storage administrator. An "aggregate" is a logical aggregation of physical storage, i.e., a logical container for a pool of storage, combining one or more physical mass storage devices (e.g., disks) or parts thereof into a single logical storage object, which contains or provides storage for one or more other logical data sets at a higher level of abstraction (e.g., volumes).

"Volume" means a logical data set which is an abstraction of physical storage, combining one or more physical mass storage devices (e.g., disks) or parts thereof into a single logical storage object, and which is managed as a single administrative unit, such as a single file system. A volume is typically defined from a larger group of available storage, such as an aggregate.

As used in this disclosure, the terms "component" "module", "system," and the like are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one embodiment, a method and system for accessing storage is provided. A first logical data structure is created without receiving a client request from a computing system. A first identifier for identifying the first logical data structure is assigned to the first logical data structure. Upon receiving a client request, a second logical data structure associated with a storage device is generated and the first identifier is assigned to the second logical data structure. The second logical data structure identified by the first identifier is then used by the computing system.

In another embodiment, a machine implemented method is provided. A client request for accessing a logical data structure associated with a storage device is received. The process retrieves a first identifier for a logical data structure created before the client request is received. The logical data structure in response to the client request is then generated and the first identifier is used to identify the generated logical data structure.

In one embodiment, a method and system is provided for accessing LUNs. A first LUN (also referred to as a dummy LUN with a first LUN identifier (ID) (may also be referred to as first LUN ID) without a client request from a client computing system. The dummy LUN is created by a storage system on behalf of a management application.

After the dummy LUN is created, the dummy LUN ID is discovered by a computing system. When the computing system wants to create and use a LUN, a second LUN with a second LUN ID is created by the storage system. The LUN ID for the second LUN is swapped with the already discovered dummy LUN ID. The computing system is able to use the second LUN without having to go through a discovery process.

In one embodiment, the dummy LUN is created when the storage system and the management application are not busy with other tasks. Resources are used efficiently because when the computing system wants to create and use a LUN, it does not have to go through a discovery process because an already discovered dummy LUN ID is used for the second LUN.

System:

FIG. 1A shows an example of a system 10 in which the various embodiments of the present disclosure can be implemented. For example, the various embodiments may be included in storage system 20 and management application 18, as described below in detail.

System 10 may include a plurality of storage systems 20, each coupled to a separate mass storage subsystem 26. A storage subsystem 26 may include multiple mass storage devices (e.g., disks). The mass storage devices in each storage subsystem 26 may be, for example, conventional magnetic disks, optical disks such as CD-ROM or DVD based storage, magneto-optical (MO) storage, or any other type of non-volatile storage devices suitable for storing data. Each storage subsystem 26 is managed by a corresponding storage system 20. The storage devices in each storage subsystem 26 can be organized into one or more RAID groups, in which case the corresponding storage system 20 accesses the storage subsystem 26 using an appropriate RAID protocol.

Each storage system 20 may operate as a NAS based file server, a block-based storage server such as used in a storage area network (SAN), or a combination thereof, or a node in a clustered environment described below with respect to FIG. 1D or any other type of storage server. Note that certain storage systems from Network Appliance, Inc. (NetApp®) in Sunnyvale, Calif., are capable of providing clients with both file-level data access and block-level data access.

The storage systems 20 may be coupled through a network 14 to a number of clients 12. Each of the clients 12 may be, for example, a conventional personal computer (PC), workstation, or the like. The network 14 may be, for example, a local area network (LAN), a wide area network (WAN), or other type of network or a combination of networks.

Clients 12 may be general purpose computers having a plurality of components. These components may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits. A computer system with the CPU and main memory is often referred to as a host system.

Each storage system 20 receives and responds to various read and write requests from clients 12, directed to data stored in or to be stored in a corresponding storage subsystem 26.

Also connected to the network 14 is a management console 16, in which a storage management application 18 may reside and execute. The management console 16 may be, for example, a conventional PC, workstation, or the like. The storage management application 18 may be a software application used by a storage network administrator to manage a pool of storage devices (may also be referred to as a "resource pool"). This application enables the administrator to perform various operations, such as monitoring and allocating storage space in the storage pool, creating and deleting volumes, directories and others. The application also allows a storage administrator to provision and configure storage space, as described below in detail.

Communication between the storage management application 18 and storage systems 20 may be accomplished using any of the various conventional communication protocols and/or application programming interfaces (APIs), the details of which are not germane to the technique being introduced here. This communication can be done through the network 14 or it can be via a direct link (not shown) between the management console 16 and one or more of the storage systems 20.

One or more other storage-related software applications 24 may also be operatively coupled to the network 14, residing and executing in one or more other computer systems 22. Examples of such other applications include data backup software, Snapshot management software and others.

The management application 18 provisions storage space for a client 12. Management application 18 sends a request to the storage system 20 servicing the client to create a LUN. The LUN is created by the storage system 20 and then presented to the management application 18. The LUN may appear as a "drive" to the client 12. This allows the client to read and write data to a particular LUN. FIG. 1A shows LUN 1 26A and LUN 26B that may be presented to client 12 after a provisioning operation.

Client 12 performs a discovery process to discover the LUN, before it can access and use the LUN. The discovery process depends on a type of protocol that is used by client 12 to access the provisioned storage. For example, if client 12 uses FCP to access storage space, then a FC discovery process is used to identify the LUN. The discovery process is typically initiated by an adapter, for example, a host bus adapter (not shown).

One challenge that clients 12 face is that LUN discovery can be time consuming and may waste system resources. The embodiments described herein reduce the overhead associated with the LUN discovery process.

Storage Management Application:

The techniques being introduced here may be implemented in the storage management application 18, for example, by a provisioning manager 30, as described below in detail with respect to FIG. 1B. In one embodiment, a client request for a LUN is received by the management application 18. The management application 18 retrieves a first identifier for a first LUN (for example, a dummy LUN) created before the client request is received. The LUN in response to the client request is then generated and the first identifier is used to identify the generated LUN.

Figure 1B:
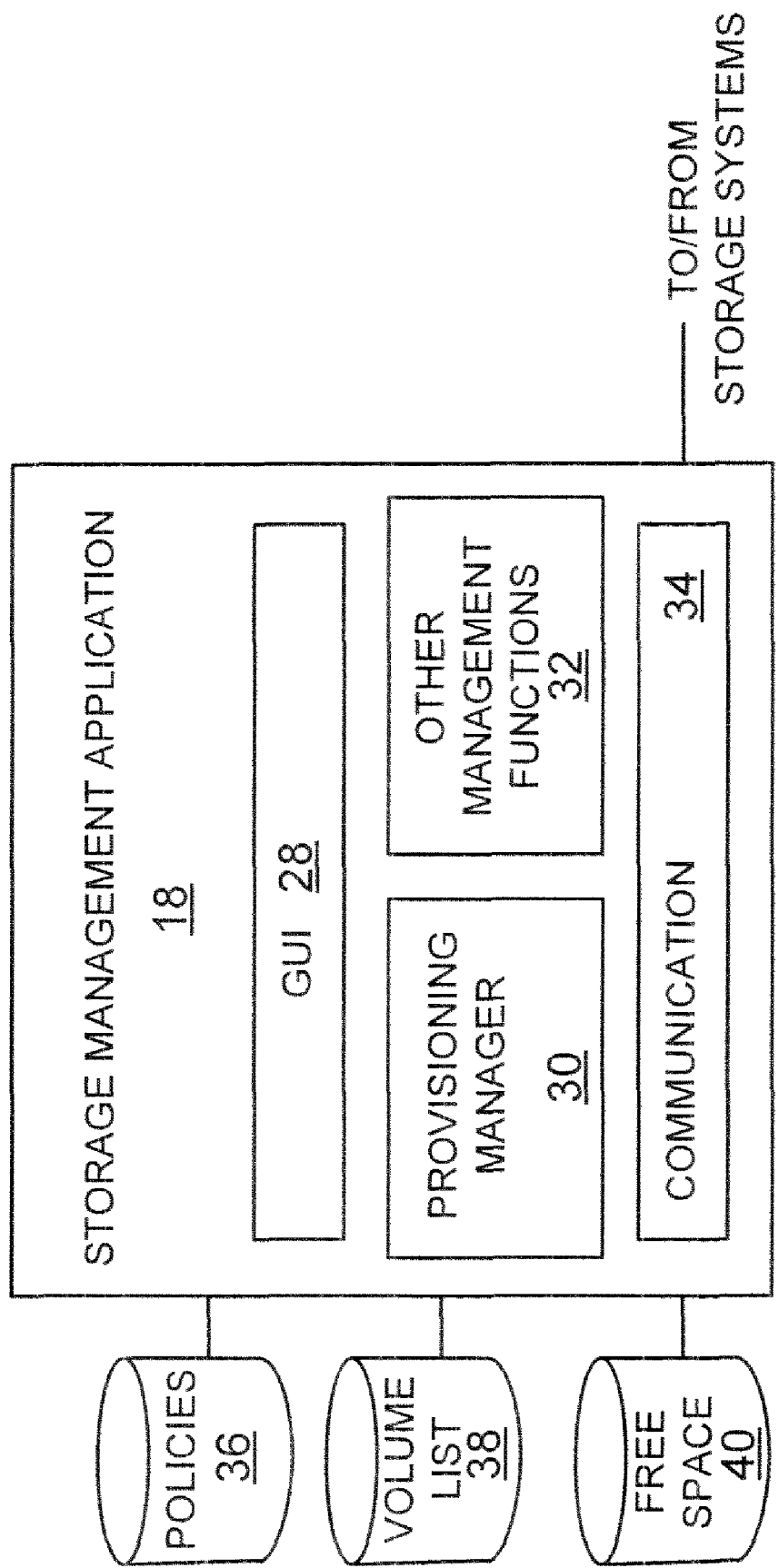
FIG. 1B shows a block diagram of a storage management application, according to one embodiment of the present disclosure.

In the illustrated embodiment of FIG. 1B, the storage management application 18 includes a graphical user interface (GUI) module 28 to generate a GUI (e.g., for use by a storage administrator); a provisioning manager 30 for provisioning storage and creating LUNs, according to one embodiment; one or more other management modules 32 to perform various other storage management related functions; and a communication module 34. The storage management application 18 may also maintain policies 36, a list 38 of all volumes in a storage pool as well as a table 40 of all free space (on a per-disk basis) in a storage pool.

Provisioning manager 30 typically receives a provisioning request from a user. The request may specify storage space requirement. Based on the space requirement provisioning manager 30 scans a storage resource pool to select storage space.

Provisioning manager 30 communicates with a storage system 20 that manages the selected storage space. The communication module 34 may implement one or more conventional communication protocols and/or APIs to enable the storage management application 18 to communicate with the storage systems 20.

Storage system 20 provides a LUN identifier (may also be referred to as LUN ID) for the provisioned storage space. The LUN attributes for example, size, partitioning, security settings, path and others are also set by the storage system. Storage system 20 provides the LUN ID and attributes to the management application 18.

As mentioned above, before a LUN can be used by client 12, the LUN has to be discovered, typically, by a complex discovery process. In one embodiment, a dummy LUN (or a dummy logical data structure) is first created with a dummy LUN ID. The dummy LUN may be created by management application 18 and storage system 20 without receiving a LUN creation request from client 12. In one embodiment, the dummy LUN is created when management application 18 and the storage system 20 are not busy with other tasks. This allows one to create the dummy LUN without wasting computing resources. After the dummy LUN is created, the dummy LUN ID is discovered by client 12.

When the client 12 wants to use an actual LUN, based on a client request, a second LUN (LUN2) is created with a second LUN ID. However, the second LUN ID is not provided to client 12, but instead, the second LUN ID is swapped with the dummy LUN ID discovered by client 12 before LUN2 is presented to the client. Because the dummy LUN ID was already discovered, client 12 does not have to discover the second LUN because it uses the already discovered dummy LUN ID. This saves processing time and hence improves overall efficiency in accessing storage.

The various adaptive embodiments of the present disclosure and the functionality of the storage management application are now described below with respect to the process flow diagram of FIG. 1C.

Figure 1C:
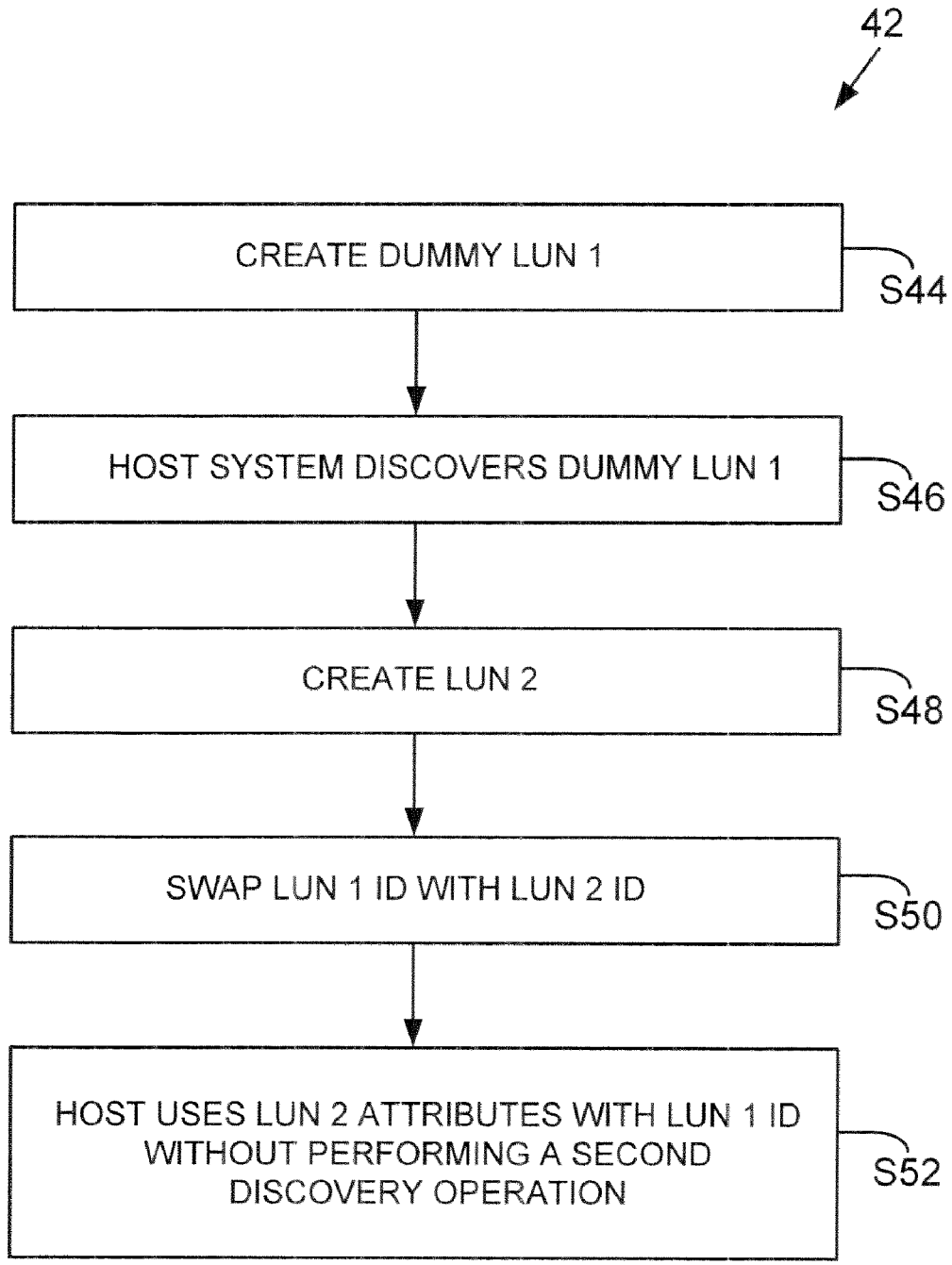
FIG. 1C shows a process flow diagram for swapping LUN identifiers, used according to one embodiment.

Process Flow:

FIG. 1C shows a process flow diagram 42 for using dummy LUN identifiers to reduce discovery overhead in networked storage systems. The process begins in block S44, when first a dummy LUN (may also be referred to as a first LUN or dummy LUN1) is created. For example, LUN 1 26A of FIG. 1A may be a dummy LUN. The term "dummy LUN" as used herein means a LUN that is created without a client 12 request.

In one embodiment, the dummy LUN may be created by the storage system 20 upon receiving a request from the management application 18. The dummy LUN is assigned a LUN ID (also referred to as dummy LUN ID or first LUN ID) by the storage system 20.

The dummy LUN is created at an instance when the storage system 20 and the management application 18 may not be busy. This allows one to create the dummy LUN without consuming excessive computing resources.

In block S46, a client 12 discovers the dummy LUN with the dummy LUN ID. The discovery process and protocol may depend on the storage environment. For example, for FC devices, the FCP discovery process may be used to discover the dummy LUN.

In response to a client request, in block 48, a second LUN (LUN2) is created by management application 18 and storage system 20. LUN2 is also assigned a LUN ID by the storage system (may be referred to as "second LUN ID" or "LUN2").

In block S50, the second LUN ID is swapped (exchanged or replaced) with the already discovered dummy LUN ID. In one embodiment, to swap the LUN ID, management application 18 may maintain a plurality of data structures (not shown) with information for each LUN. The data structures in this case may be a table, a relational database, an object or other similar structures. A first data structure may include information regarding LUN1 with the LUN1 identifier. A second data structure may include information regarding LUN2 with the LUN2 ID after the client request is processed. A third data structure may include information regarding LUN2 using the swapped LUN1 ID.

To swap the LUN ID, management application 18 may retrieve the first data structure created before the request was received and then create the third data structure with the swapped LUN ID.

After the LUN ID is swapped, in block S52, client 12 can use LUN2 attributes with the dummy LUN ID without having to discover LUN2.

This saves time and computing resources and improves the overall efficiency with which LUNs can be accessed and used by computing systems.

Although the foregoing descriptions are based on LUNs, the adaptive embodiments disclosed herein are applicable to any data structure associated with provisioned storage that a computing system needs to discover prior to using the data structure.

Figure 1D:
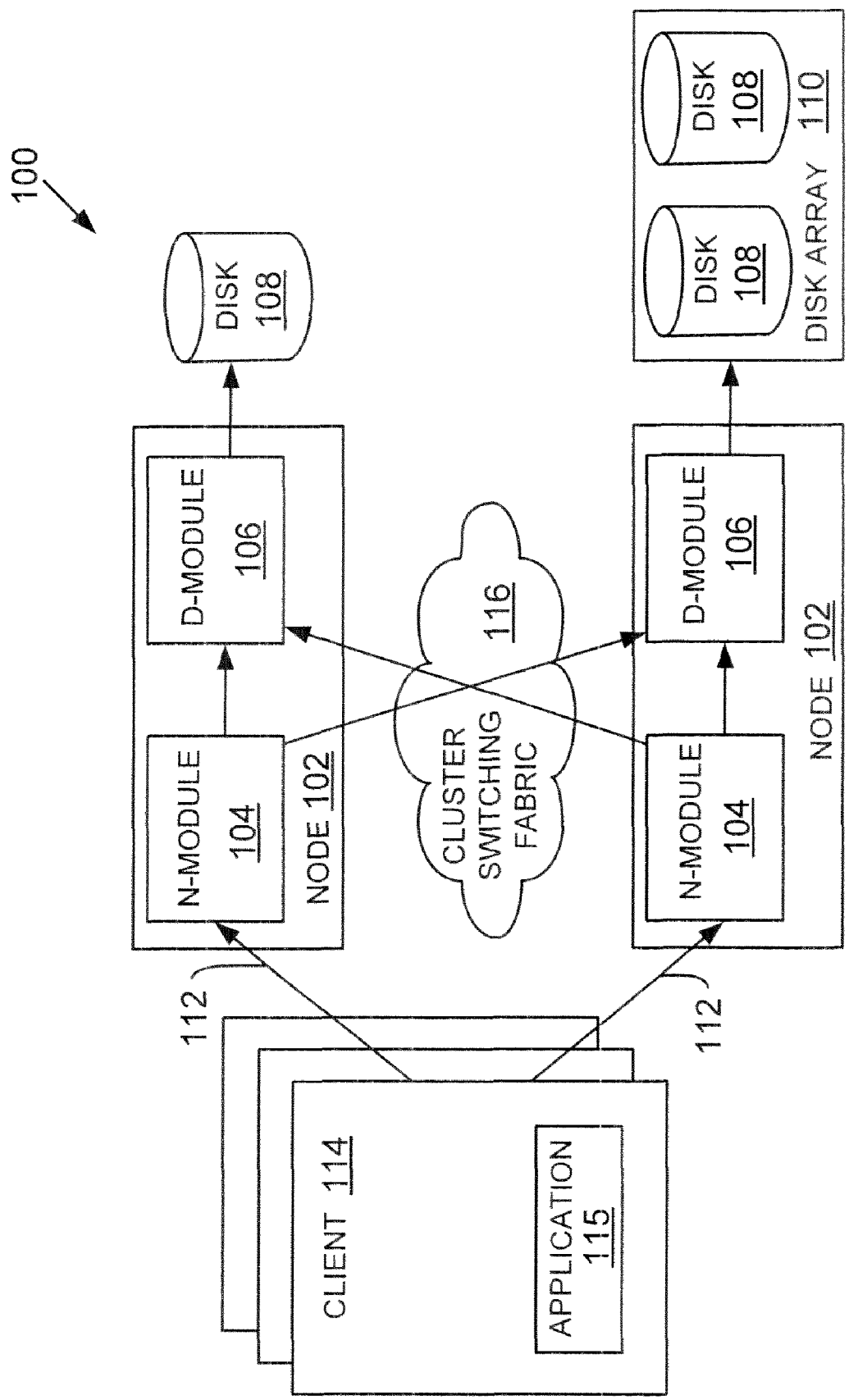
FIG. 1D shows a block diagram of a clustered system, according to one embodiment.

Clustered System:

FIG. 1D is a schematic block diagram of a plurality of nodes 102 interconnected as a cluster 100 and configured to provide storage services related to organization of information on storage devices. A global namespace is used to uniquely identify the cluster system 100. The foregoing embodiments may be implemented by a node 102 interfacing with a management application (for example, 18).

Nodes 102 comprise various functional components that cooperate to provide distributed storage system architecture of cluster 100. Each node 102 is generally organized as a network element (N-module 104) and a disk element (D-module 106). N-module 104 includes functionality that enables node 102 to connect to clients 114 over a computer network 112, while each D-module 106 connects to one or more storage devices, such as disks 108 or a disk array 110 (similar to storage subsystem 26, FIG. 1A).

Nodes 102 may be interconnected by a cluster switching fabric 116 which, in the illustrative embodiment, may be embodied as a Gigabit Ethernet switch. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 102 comprising one N-module and one D-module should be taken as illustrative only.

Clients 114 may be configured to interact with the node 102 in accordance with a client/server model of information delivery. That is, each client 114 may request the services of the node 102, and the node 102 may return the results of the services requested by the client 114, by exchanging packets over the network 112. The client 114 may issue packets using application 115 including file-based access protocols, such as the CIFS protocol or the NFS protocol, over TCP/IP when accessing information in the form of certain data containers, such as files and directories. Alternatively, the client 114 may issue packets using application 115 including block-based access protocols, such as the iSCSI protocol when accessing information in the form of other data containers, such as blocks.

Figure 2:
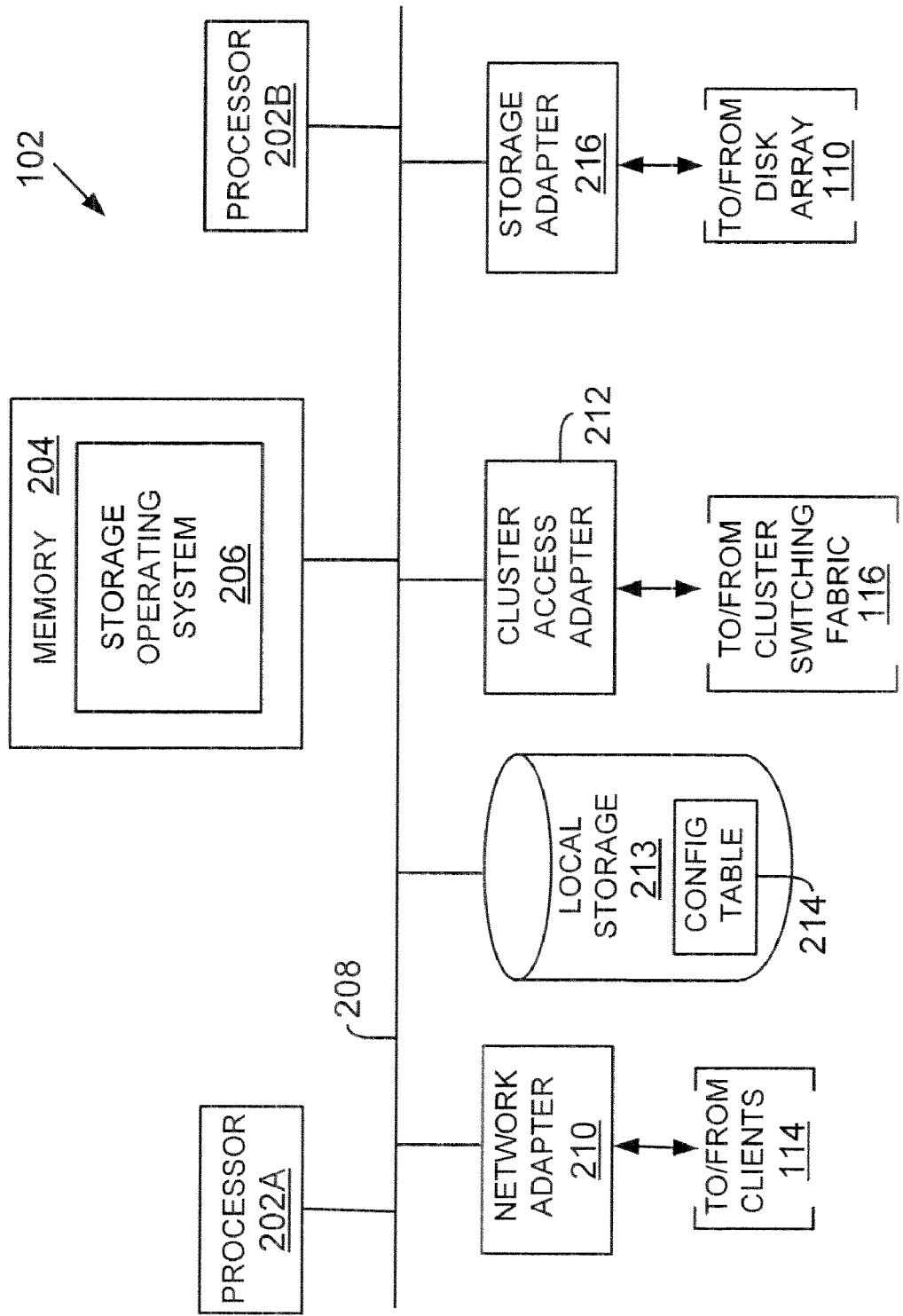
FIG. 2 shows a block diagram of a node used in the system of FIG. 1D, according to one embodiment.

Storage System Node:

FIG. 2 is a block diagram of a node 102 that is illustratively embodied as a storage system comprising of a plurality of processors 202A and 202B, a memory 204, a network adapter 210, a cluster access adapter 212, a storage adapter 216, and local storage 213 interconnected by a system bus 208. The local storage 213 comprises one or more storage devices, such as disks, utilized by the node to locally store configuration information (e.g., in a configuration table 214).

The cluster access adapter 212 comprises a plurality of ports adapted to couple node 102 to other nodes of cluster 100. In the illustrative embodiment, Ethernet may be used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 212 is utilized by the N/D-module for communicating with other N/D-modules in the cluster 100.

Each node 102 is illustratively embodied as a dual processor storage system executing a storage operating system 206 that preferably implements a high-level module, such as a file system, to logically organize the information as a hierarchical structure of named directories, files and special types of files called virtual disks (hereinafter generally "blocks") on disks 108. However, it will be apparent to those of ordinary skill in the art that the node 102 may alternatively comprise a single or more than two processor systems. Illustratively, one processor 202A executes the functions of the N-module 104 on the node, while the other processor 202B executes the functions of the D-module 106.

The memory 204 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the invention described herein.

The storage operating system 206, portions of which is typically resident in memory and executed by the processing elements, functionally organizes the node 102 by, inter alia, invoking storage operations in support of the storage service implemented by the node. An example of operating system 206 is the DATA ONTAP® (Registered trademark of NetApp, Inc.) operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 210 comprises a plurality of ports adapted to couple the node 102 to one or more clients 114 over point-to-point links, wide area networks, virtual private networks implemented over a public network (Internet) or a shared local area network. The network adapter 210 thus may comprise the mechanical, electrical and signaling circuitry needed to connect the node to the network. Illustratively, the computer network 112 may be embodied as an Ethernet network or a FC network. Each client 114 may communicate with the node over network 112 by exchanging discrete frames or packets of data according to pre-defined protocols, such as TCP/IP.

The storage adapter 216 cooperates with the storage operating system 206 executing on the node 102 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 108 of array 110. The storage adapter 216 comprises a plurality of ports having input/output (I/O) interface circuitry that couples to the disks over an I/O interconnect arrangement, such as a conventional high-performance, FC link topology.

Storage of information on each array 110 is preferably implemented as one or more storage volumes that comprise a collection of physical storage disks 108 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

Figure 3:
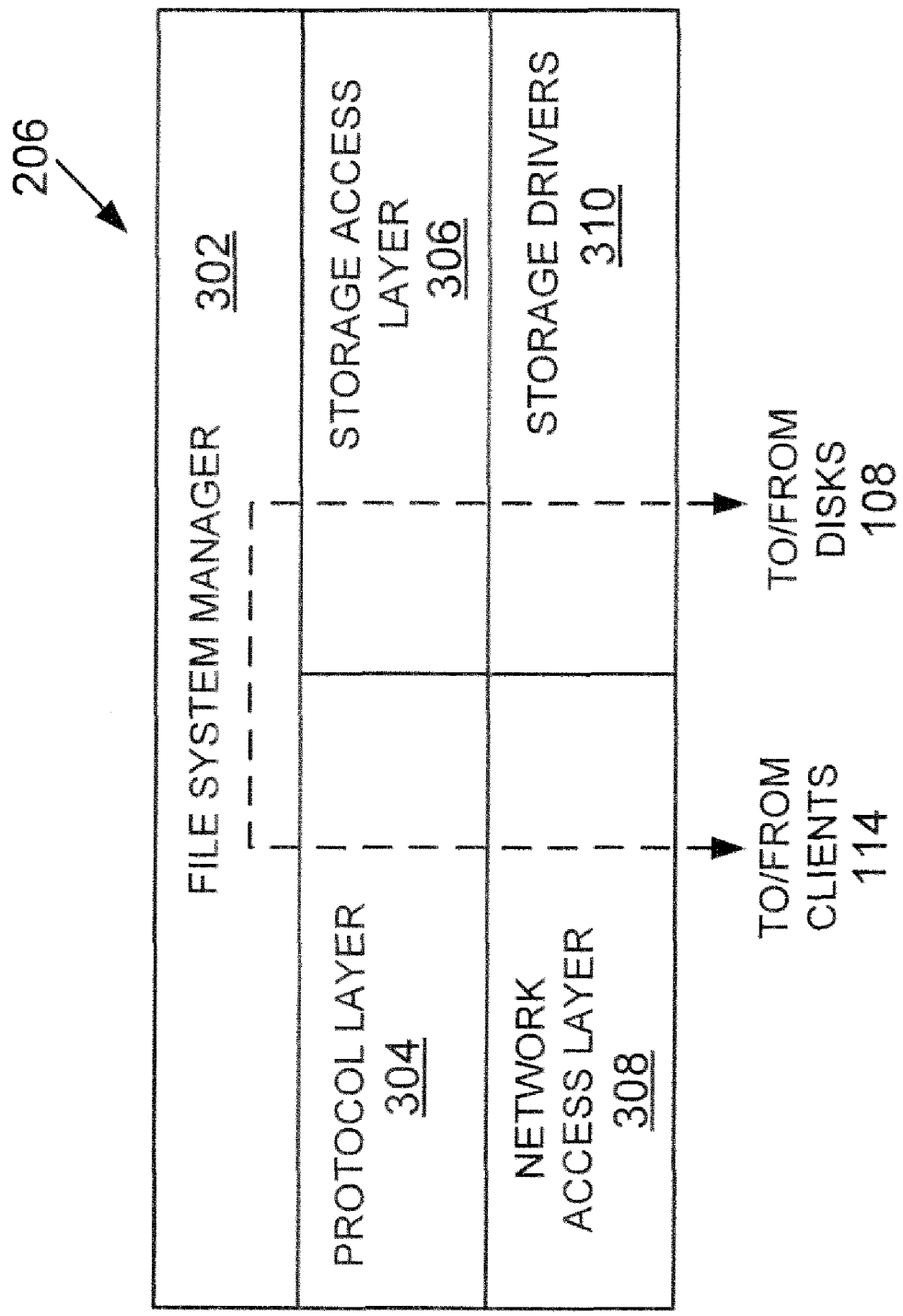
FIG. 3 shows a block diagram of an operating system used by a storage system, according to one embodiment.

Operating System:

FIG. 3 illustrates a generic example of operating system 206 executed by node 102, according to one embodiment of the present disclosure. In one example, operating system 206 may include several modules, or "layers" executed by one or both of N-Module 104 and D-Module 106. Operating system 206 interfaces with management application 18 for executing the process steps of the various embodiments described above.

Operating system 206 layers include a file system manager 302 that keeps track of a directory structure (hierarchy) of the data stored in storage devices and manages read/write operations, i.e. executes read/write operations on disks in response to client 114 requests.

Operating system 206 may also include a protocol layer 304 and an associated network access layer 308, to allow node 102 to communicate over a network with other systems, such as clients 114. Protocol layer 304 may implement one or more of various higher-level network protocols, such as NFS, CIFS, Hypertext Transfer Protocol (HTTP), TCP/IP and others.

Network access layer 308 may include one or more drivers, which implement one or more lower-level protocols to communicate over the network, such as Ethernet. Interactions between clients 114 and mass storage devices 108 (e.g. disks, etc.) are illustrated schematically as a path, which illustrates the flow of data through operating system 206.

The operating system 206 may also include a storage access layer 306 and an associated storage driver layer 310 to allow D-module 106 to communicate with a storage device. The storage access layer 306 may implement a higher-level disk storage protocol, such as RAID (redundant array of inexpensive disks), while the storage driver layer 310 may implement a lower-level storage device access protocol, such as FC or SCSI. In one embodiment, the storage access layer 306 may implement the RAID protocol, such as RAID-4 or RAID-DP™ (RAID double parity for data protection provided by NetApp Inc. the assignee of the present disclosure).

As used herein, the term "storage operating system" generally refers to the computer-executable code operable on a computer to perform a storage function that manages data access and may, in the case of a node 102, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as, or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

Figure 4:
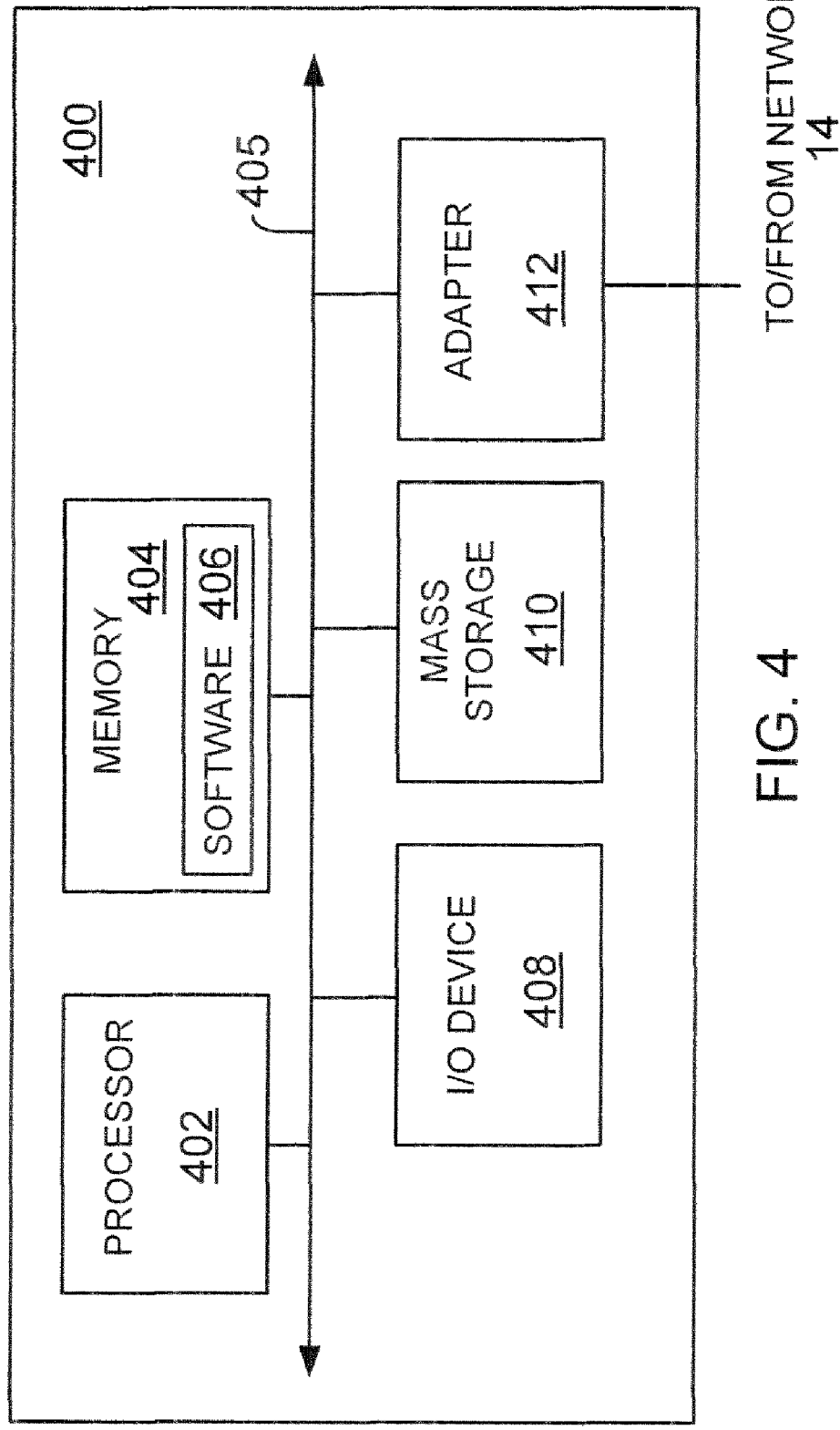
FIG. 4 shows an example of a computing system, executing instructions, according to one embodiment.

Processing System:

FIG. 4 is a high-level block diagram showing an example of the architecture of a processing system, at a high level, in which the processes described herein can be implemented. The processing system 400 can represent management console 18, for example. Note that certain standard and well-known components which are not germane to the present invention are not shown in FIG. 4.

The processing system 400 includes one or more processor 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a SCSI bus, a universal serial bus (USB), or an Institute of Electrical and Electronics Engineers (IEEE) standard 1394 bus (sometimes referred to as "Firewire").

Processor 402 is the central processing unit (CPUs) of the processing system 400 and, thus, controls its overall operation. In certain embodiments, the processor 402 accomplishes this by executing software stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Software 406 which implements the processes described herein (e.g., the storage management application 18 in FIG. 1B) may reside in and may be executed (by processor 402) from memory 404.

Also connected to processor 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers 20) over a network and may be, for example, an Ethernet adapter, a FC adapter, a Fibre Channel over Ethernet (FCOE) adapter or the like. The processing system 400 also includes one or more input/output (I/O) devices 408 coupled to the bus system 63. The I/O devices 408 may include, for example, a display device, a keyboard, a mouse, etc.

Thus, a method and apparatus for accessing LUNs have been described. Note that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
   (a) creating a first logical data structure without receiving a client request from a client computing system;
   (b) assigning a first identifier (ID) to the first logical data structure for identifying the first logical data structure;
   (c) discovering by the client computing system the first logical data structure identified by the first logical data structure ID;
   (d) upon receiving a client request from the client computing system, creating a second logical data structure associated with a storage device for storing information and assigning a second logical data structure ID for identifying the second logical data structure;
   (e) swapping the second logical data structure ID with the first logical data structure ID such that the second logical data structure is identified by the first logical data structure ID when presented to the client computing system; and
   (f) using the second logical data structure by the client computing system for reading information from and writing information to the storage device without having to discover the second logical data structure identified by the first logical data structure ID.

2. The machine implemented method of claim 1, wherein a storage system creates the first logical data structure that is discovered by the client computing system.

3. The machine implemented method of claim 2, wherein the storage system assigns the first logical data structure ID.

4. The machine implemented method of claim 1, wherein a management application requests a storage system to create the first logical data structure.

5. The machine implemented method of claim 4, wherein the management application swaps the second logical data structure ID with the first logical data structure ID.

6. The machine implemented method of claim 1, wherein the second logical data structure is a logical unit number (LUN) associated with the storage device.

7. A machine readable storage medium storing executable instructions, which when executed by a machine, causes the machine to perform a method for accessing storage, the method comprising:
   (a) creating a first logical data structure without receiving a client request from a client computing system;
   (b) assigning a first identifier (ID) to the first logical data structure for identifying the first logical data structure;
   (c) discovering by the client computing system the first logical data structure identified by the first logical data structure ID;
   (d) upon receiving a client request from the client computing system, creating a second logical data structure associated with a storage device for storing information and assigning a second logical data structure ID for identifying the second logical data structure;
   (e) swapping the second logical data structure ID with the first logical data structure ID such that the second logical data structure is identified by the first logical data structure ID when presented to the client computing system; and
   (f) using the second logical data structure by the client computing system for reading information from and writing information to the storage device without having to discover the second logical data structure identified by the first logical data structure ID.

8. The machine readable storage medium of claim 7, wherein a storage system creates the first logical data structure that is discovered by the client comp ing system.

9. The machine readable storage medium of claim 8, wherein the storage system assigns the first logical data structure ID.

10. The machine readable storage medium of claim 7, wherein a management application requests a storage system to create the first logical data structure.

11. The machine readable storage medium of claim 10, wherein the management application swaps the second logical data structure ID with the first logical data structure ID.

12. The machine readable storage medium of claim 7, wherein the second logical data structure is a logical unit number (LUN) associated with the storage device.

13. A computer program product, comprising:
   a non-transitory computer usable storage medium having computer readable instructions embodied therein for accessing storage, comprising:
   (a) instructions for creating a first logical data structure without receiving a client request from a client computing system;
   (b) instructions for assigning a first identifier (ID) to the first logical data structure for identifying the first logical data structure;
   (c) instructions for discovering by the client computing system the first logical data structure identified by the first logical data structure ID;
   (d) instructions for upon receiving a client request from the client computing system, creating a second logical data structure associated with a storage device for storing information and assigning a second logical data structure ID for identifying the second logical data structure;
   (e) instructions for swapping the second logical data structure ID with the first logical data structure ID such that the second logical data structure is identified by the first logical data structure ID when presented to the client computing system; and
   (f) instructions for using the second logical data structure by the client computing system for reading information from and writing information to the storage device without having to discover the second logical data structure identified by the first logical data structure ID.

14. The computer program product of claim 13, wherein a storage system creates the first logical data structure that is discovered by the client computing system.

15. The computer program product of claim 14, wherein the storage system assigns the first logical data structure ID.

16. The computer program product of claim 13, wherein a management application requests a storage system to create the first logical data structure.

17. The computer program product of claim 16, wherein the management application swaps the second logical data structure ID with the first logical data structure ID.

18. The computer program product of claim 13, wherein the second logical data structure is a logical unit number (LUN) associated with the storage device.

19. A machine implemented method, comprising:
   (a) receiving a client request from a client computing system for generating a logical data structure associated with a storage device for storing information;
   (b) retrieving a first identifier for a first logical data structure created before the client request is received, where the first logical data structure identified by the first identifier is discovered by the client computing system before the client request; and
   (c) generating the logical data structure in response to the client request and using the first identifier to identify the generated logical data structure that is presented to the client computing system for reading information from and writing information to the storage device; and
   (d) using the logical data structure identified by the first identifier, without having to discover the logical data structure.

20. The machine implemented method of claim 19, wherein a management application requests a storage system to create the logical data structure before receiving the client request and the storage system assigns the first identifier.

21. The machine implemented method of claim 20, wherein the management application exchanges a second identifier for the logical data structure generated in response to the client request with the first identifier.

22. The machine implemented method of claim 19, wherein the logical data structure is a logical unit number (LUN).

23. A machine implemented method, comprising:
   (a) generating a first logical data structure without receiving a client request from a client computing system;

(b) assigning a first identifier to the first logical data structure;

(c) upon receiving a client request from the client computing system, generating a second logical data structure associated with a storage device and assigning the first identifier to the second logical data structure for identifying the second logical data structure when presented to the client computing system; and (d) using the second logical data structure identified by the first identifier without having to discover the second logical data structure.

24. The machine implemented method of claim 23, wherein a management application requests a storage system to create the first logical data structure and the storage system assigns the first identifier.

25. The machine implemented method of claim 24, wherein the management application exchanges a second identifier for the second logical data structure provided by the storage system with the first identifier.

26. The machine implemented method of claim 23, wherein the logical data structure is a logical unit number (LUN).

27. A machine implemented method for accessing a logical unit number LUN), comprising:

(a) creating a first LUN without receiving a client request from a client computing system;

(b) assigning a unique first LUN identifier (first LUN ID) to the first LUN;

(c) discovering the first LUN having the first LUN ID by the client computing system;

(d) upon receiving a client request from the client computing system, creating a second LUN with an assigned second LUN identifier (second LUN ID);

(e) swapping the second LUN ID with the first LUN ID such that the second LUN is identified by the first LUN ID when the second LUN is presented to the client computing system; and (f) using the second LUN identified by the first LUN ID, without having to discover the second LUN ID.

28. The machine implemented method of claim 27, wherein a storage system creates the first LUN that is discovered by a client computing system.

29. The machine implemented method of claim 28, wherein the storage system assigns the first LUN ID.

30. The machine implemented method of claim 27, wherein a management application requests a storage system to create the first LUN.

31. The machine implemented method of claim 30, wherein the management application swaps the second LUN ID with the first LUN ID.

32. The machine implemented method of claim 27, wherein the client request is received in a clustered system.

* * * * *